United States Patent Office 3,138,557
Patented June 23, 1964

3,138,557
COMPOSITION AND PROCESS FOR REMOVAL OF COATINGS BASED ON EPOXY RESINS
Benjamin Arden, Portuguese Bend, and Robert B. Roessler, Rolling Hills Estates, Calif., assignors to Purex Corporation, Ltd., South Gate, Calif., a corporation of California
No Drawing. Filed Sept. 5, 1961, Ser. No. 135,727
15 Claims. (Cl. 252—136)

This invention relates to compositions useful in the removal or stripping of paints or coatings, and is more especially directed to a composition particularly effective in the removal of chemically resistant coatings and paints such as those based on epoxy resins.

During recent years, very adherent, durable paints and coatings based upon chemically resistant resins have been developed, owing to the superior properties of these paints or coating compositions over the conventional lacquers and paints. However, because of the tenacity and durability of certain coatings based on such resins, and particularly on certain epoxy resins, cured by incorporation of amine catalysts, there has been a problem of developing means for removing or stripping such obdurate coatings and paints rapidly and efficiently from surfaces to which they have been applied, for example, from defectively coated parts, or parts which it is desired to repaint. Although strippers have been developed for this purpose, they have not proven entirely satisfactory from the standpoint of rapid removal of certain of these coatings, and freedom from adversely affecting or damaging the substrate, particularly where the substrate is aluminum, magnesium or steel. Many prior art compositions require several hours or more for complete stripping of chemically resistant coatings, while others requiring a shorter period for this purpose are too corrosive to the substrate, especially where the latter is magnesium, aluminum, or steel.

It is an object of this invention to provide novel coating or paint stripping compositions having superior effectiveness for removing obdurate coating compositions such as those based upon epoxy resins.

Another object of this invention is the provision of novel paint and coating strippers effective for removing chemically resistant paints or coatings within a relatively short period, for example of the order of about 3 hours.

Still another object is the provision of novel paint and coating strippers effective for removing obdurate paints or coatings rapidly and which during their period of application are substantially non-corrosive to the substrate, particularly aluminum, magnesium or steel.

Yet another object is the design of non-flammable stripping compositions having the aforementioned characteristics.

A still further object is to afford paint strippers of the nature noted above, which have good stability and which can be applied either by immersion of the part in the composition or by spray, brush or similar application to the coated surface of the part.

Still another object is the provision of procedure for removal of obdurate paints and coatings such as those based on epoxy resins, employing the aforementioned types of stripping compositions.

Other objects and advantages will appear hereinafter.

The invention is based on the unexpected discovery that when hypophosphorous acid ($H_3PO_2$) is incorporated into stripping compositions containing a substantial proportion of chlorinated hydrocarbon solvent, preferably methylene chloride, and preferably also containing water and a coupling agent such as a lower alcohol, the effectiveness of the composition for removing paints and coatings based on epoxy resins, is materially improved over prior art compositions containing in place of hypophosphorous acid, other activators such as ammonia, amines, organic acids, e.g., aliphatic acids, and phenols. Other optional ingredients can be incorporated also in the composition, such as, for example, corrosion inhibitors, surface active agents, evaporation retardants, and/or thickeners.

Thus, employing hypophosphorous acid in stripping compositions according to the invention, coating systems of the most tenacious and durable nature such as those composed of amine catalyzed epoxy resins can be stripped from the adjacent substrate in a substantially reduced period of the order of about three hours, as compared to conventional strippers for this purpose which, if they strip at all, may require, for example, 10 hours or more, for stripping such coatings.

It is believed that the stripper containing chlorinated hydrocarbon, e.g., methylene chloride, functions in the nature of a penetrating and swelling agent which causes the coating to swell or expand and thus detach itself from the surface to which it is applied, and that the hypophosphorous acid has an efficient activating effect on this penetrating and softening action by which it assists the chlorinated hydrocarbon to pass through the coating. The hypophosphorous acid appears to have a bond releasing function which aids in breaking the bond holding the coating to the substrate. As a result of the combined effect of the chlorinated hydrocarbon and the hypophosphorous acid, the expanded softened coating can be stripped or rinsed from the surface of the part in a minimum period of time, as above noted. The superior action of hypophosphorous acid as an activator in paint stripping compositions of the character described herein, over other acids tested, including the related phosphoric and phosphorus acids, indicates the possibility that such superior effectiveness may be related to the reducing action of hypophosphorous acid in addition to that of its acidity. However, the invention is not to be taken as limited by any theory of the function of the hypophosphorous acid in the paint stripping compositions of the invention.

The amount of hypophosphorous acid which can be employed can vary in the range of about 0.25 to about 15% by weight of the composition, and preferably is in the range of about 1 to about 10%, an optimum quantity being about 4% by weight. Amounts larger than about 10% by weight are not favored, since this increases corrosive effects on magnesium and aluminum parts and decreases stability of the composition. Use of insufficient hypophosphorous acid does not effectively decrease stripping time. Hypophosphorous acid is preferably employed in the form of the commercially available 50% aqueous solution, although aqueous solution of other concentrations can be employed.

The chlorinated organic solvent used in our composition is exemplified by methylene chloride, ethylene dichloride, trichloroethylene, methyl chloroform, propylene dichloride, perchloroethylene, 1,2,4 trichlorobenzene and orthodichlorobenzene. All of these chlorinated materials are liquids throughout the entire range of operating temperatures normally employed with the compositions of the invention. The choice of the particular chlorinated organic solvent used is influenced by the operating temperature for which a particular coating stripping composition is formulated. Thus, the low boiling chlorinated aliphatic hydrocarbons noted above are preferably employed with compositions which are designed to be used at or near room temperatures, while chlorinated benzene derivatives, such as orthodichlorobenzene, are primarily suitable for use with compositions which are designed to be used at elevated temperatures. In general, the quantity of the chlorinated organic solvent is varied to accommodate other ingredients, but will normally be present in amounts generally in the range of about 40 to about 80%, preferably about 50 to about 70% by weight of the total composition.

Because of the corrosive nature of hypophosphorous acid on metals such as aluminum, magnesium and steel, it is generally preferred to incorporate suitable amounts of corrosion inhibitors into the composition. The inhibitors so employed should be of a nature which produce maximum corrosion inhibiting effect on the metal part from which the coating is stripped without adversely affecting the function of the hypophosphorous acid, or in other words, substantially without decreasing the rate of coating removal. We have found that a number of corrosion inhibitors give good inhibition while permitting rapid stripping. These include among others, for example, the ampholytic surface active compounds (1) oleyl ethyl cycloimidinium 1-hydroxy, 3-ethyl sodium alcoholate, 2-methyl sodium carboxylate (marketed as Miranol OM-SF), (2) N-alkyl amino sodium propionate, the alkyl group containing from 12 to 14 carbon atoms (marketed as Deriphat 151), and oleyl sarcosine (marketed as Sarkosyl O). By proper use of inhibitors such as those noted above, the attack of the coating stripper of the invention upon metals such as magnesium, aluminum and steel, and their alloys, can be materially reduced with little, if any, adverse effect on the stripping effectiveness of the composition. Generally, about 0.1 to about 2%, preferably about 0.3 to about 1.5% of the inhibitor or combination of inhibitors are employed based on the weight of the composition.

The presence of minor amounts of water in the stripping composition of the invention is of importance in reducing the stripping time. Thus an amount of water for this purpose in the range of from about 0.25% to as high as about 15% and preferably from about 0.25% to about 5%, is utilized. If an amount of water greater than about 15% is employed, this tends to increase stripping time. The water employed in the composition may be introduced as such or may be introduced together with one or more of the other components of the composition. For example, it is convenient to employ a commercially avaliable 50% aqeuous hypophosphorus acid solution, the use of this latter material introducing all or part of the required amount of water into the composition.

In order to improve the compatibility of the water with the chlorinated hydrocarbon, e.g., methylene chloride, employed in the composition, it has been found useful to employ a coupling agent. The coupling agent functions as a mutual solvent for the water and the chlorinated hydrocarbon such as methylene chloride. Examples of coupling agents which can be employed include lower aliphatic alcohols such as methanol, ethanol and isopropanol, and their glycol ethers, such as the methyl, ethyl or butyl ethers of ethylene, diethylene, or propylene glycol, the preferred material being methanol. The amount of such coupling agent employed may range from about 3 to about 20%, preferably about 5 to about 15% by weight of the composition. It has been found that in the absence of such coupling agent the aqueous phase is not rendered fully active in the chlorinated hydrocarbon and the results are not as effective as when employing such coupling agent.

Various surface active agents which are substantially stable to hypophosphorous acid or with any of the other ingredients of the composition, are also desirably employed in the compositions according to the invention. A surface active agent found particularly suitable is marketed as Petronate HL. The latter material is a petroleum sulfonate composition composed of about 62% petroleum sulfonate, believed to be of the approximate composition $C_{26}H_{42}SO_3Na$ and an average molecular weight of 457, 33% mineral oil, and 5% water.

It has been found that this surface active agent imparts satisfactory water rinsability, penetration and shelf stability to the composition and aids in inhibiting corrosion, particularly on aluminum and magnesium alloys.

However, other acid-stable surface active agents can be employed, an example of another such wetting agent being Nacconol Z which is an 85% alkyl benzene sulfonate having an average of 12 carbon atoms in the alkyl chain. Alkyl aryl sulfonates having, for example, 9 to 15 carbon atoms in the alkyl chain can be employed. The amount of surface active agent which can be employed can vary in the range from about 2 to about 10% by weight of the composition.

Also preferably, but not necessarily, employed in the invention composition are evaporation retardants. The function of these materials is to maintain the composition unchanged after it has been sprayed or poured on a coating, by holding evaporation of the essential ingredients to a minimum during the period of stripping the coating. Generally waxes, for example, paraffin wax and microcrystalline wax are employed for this purpose. The action of such waxes is assisted by the incorporation of small amounts of high molecular weight alcohols such as ethylhexanol and pine oil, as well as high molecular weight glycols such as hexylene glycol. The amount of wax or other evaporation retardant aid which can be employed may vary from about 0.1 to about 3% by weight of the composition.

Where the stripper of the invention is to be applied to obdurate coatings on inclined or vertical surfaces it is usually advantageous to incorporate in the composition a thickening agent to confer thixotropic properties to the composition. Minor amounts of suitable thickeners confer upon the composition a sufficient viscosity for this purpose, such as that in the range of about 200 to about 800 centipoises. A preferred material for this purpose is methyl cellulose, e.g., the brand marketed as Methocel. However, other suitable materials may also be employed. The amount of thickening agent generally employed may range from about 0.5 to about 3% by weight of the composition.

The following example illustrates the comparative effectiveness of the invention composition containing hypophosphorous acid, as contrasted to similar compositions including phosphorus-containing acids other than hypophosphorous acid.

EXAMPLE 1

The tests were made for each composition noted below on a dark green epoxy primer coating on anodized 2024 aluminum, the coating being air dried for 7 hours after application, and then baked at 260° F. for 100 hours. In each case the sample was immersed in the respective compositions maintained at approximately room temperature. The compositions and results are noted in Table I below.

*Table I*

| | Compositions, Parts by Volume | | |
|---|---|---|---|
| | (1) | (2) | (3) |
| Methylene chloride | 52 | 52 | 52 |
| Octafluoropentanol | 40 | 40 | 40 |
| Hypophosphorous acid | 8 | | |
| Phosphoric acid | | | 8 |
| Phosphorous acid | | 8 | |
| Time in minutes required for 100% stripping | 2.5 | 15 | >30 |

This paint, applied over anodized aluminum in a single coat, is relatively easy to strip.

It will be noted that Composition 1 above containing hydrophosphorous acid completely stripped the epoxy primer coating in a fraction of the time required in the case of Compositions 2 and 3 containing phosphorous acid and phosphoric acids, respectively, in place of hypophosphorous acid.

EXAMPLE 2

Each of the compositions below was tested for stripping effectiveness on a sample of 2024 aluminum alloy having a chromate type conversion coating formed thereon, to which was first applied a 1 mil primer coat containing an amine catalyzed epoxy resin, and over which was applied a 2.5 mil blue top coat based on amine catalyzed epoxy resin. The coating was air dried and then baked 24 hours at 200° F. The panels so coated were treated with each of the Compositions 4, 5 and 6 of Table II below by applying the paint stripper to each panel, with the panel placed flat or at a 45° angle. Stripping was rated as complete when the blue epoxy paint coating had swelled and blistered and could be rinsed off with little or no wiping. The compositions and results are given in Table II below.

*Table II*

|  | Compositions, Percent by Weight | | |
|---|---|---|---|
|  | (4) | (5) | (6) |
| Methylene chloride | 75 | 73 | 67 |
| Methyl alcohol | 8 | 8 | 8 |
| Paraffin wax | 2 | 2 | 2 |
| Methocel | 1 | 1 | 1 |
| Formic acid (90% aqueous solution) | 10 | | |
| Glycolic acid (70% aqueous solution) | | 10 | |
| Hypophosphorous acid (50% aqueous solution) | | | 18 |
| Nacconol Z | 4 | 6 | |
| Petronate HL | | | 4 |
| Time in hours required for stripping | no effect | 17 | 3.5 |

It is seen from Table II above that Compositions 4 and 5 containing no hypophosphorous acid, were ineffective to cause stripping of the epoxy coating except after many hours of treatment.

On the other hand, Composition 6 containing hypophosphorous acid stripped these obdurate amine catalyzed epoxy coating systems in a much shorter period on the order of about 3 hours.

EXAMPLE 3

The following are additional examples of epoxy stripping compositions according to the invention, Composition A being an immersion type stripper and Composition B a thixotropic epoxy stripper.

*Composition A*

| | Percent by weight |
|---|---|
| Hypophosphorous acid (50% aqueous solution) | 8.0 |
| Methyl alcohol | 12.0 |
| Corrosion inhibitor | 0.5 |
| Petronate HL (petroleum sulfonate composition) | 4.0 |
| Methylene chloride | 75.5 |
| | 100.0 |

*Composition B*

| | Percent by weight |
|---|---|
| Paraffin wax | 2.0 |
| Microcrystalline wax | 0.10 |
| Methylene chloride | 71.65 |
| Methocel | 1.75 |
| Petronate HL | 4.0 |
| Corrosion inhibitor | 0.50 |
| Hypophosphorous acid (50% aqueous solution) | 8.0 |
| Methyl alcohol | 10.0 |
| 2-ethyl hexanol | 2.0 |
| | 100.0 |

The pressence of suitable inhibitors in Compositions A and B produces low corrosion losses on aluminum and magnesium, the use of hypophosphorous acid results in materially reduced stripping time according to the invention. The stripping Compositions A and B above are also stable over relatively long periods.

Although the invention has been described primarily in relation to the stripping of epoxy coatings, the invention compositions can also be used for removal of other types of coating systems such as phenolics and amine-aldehyde condensation products, for example.

From the foregoing it is seen that the invention provides a novel composition and process for stripping chemically resistant coatings such as epoxy coatings, which are the most difficult types to remove, in a substantially shorter period of time as compared to conventional formulations for this purpose, and such compositions can be designed to cause relatively minor corrosion of the substrate during the stripping period, particularly where aluminum or magnesium is used for this purpose.

While particular embodiments of the invention have been described for the purpose of illustration, it should be understood that various modifications and adaptations thereof may be made within the spirit of the invention as set forth in the appended claims.

We claim:

1. A coating remover composition particularly adapted for removal of coatings based on epoxy resins, consisting essentially of about 40 to about 80% of a chlorinated hydrocarbon liquid solvent, about 0.25 to about 15% by weight of hypophosphorous acid, and about 0.25 to about 15% by weight of water.

2. A coating remover composition particularly adapted for removal of coatings based on epoxy resins, consisting essentially of about 40 to about 80% of methylene chloride, about 0.25 to about 15% by weight of hypophosphorous acid, and about 0.25 to about 15% by weight of water.

3. A coating remover composition particularly adapted for removal of coatings based on epoxy resins, consisting essentially of about 40 to about 80% of a chlorinated hydrocarbon liquid solvent, about 0.25 to about 15% by weight of hypophosphorous acid, about 0.25 to about 15% by weight of water, and about 3 to about 20% by weight of coupling agent selected from the group consisting of the lower aliphatic alcohols and their glycol ethers.

4. A coating remover composition particularly adapted for removal of coatings based on epoxy resins, consisting essentially of about 50 to tbout 70% by weight of methylene chloride, about 1 to about 10% by weight of hypophosphorous acid, about 0.25 to about 5% by weight of water, and about 5 to about 15% by weight of methanol.

5. A coating remover composition particularly adapted for removal of coatings based on epoxy resins, consisting essentially of about 40 to about 80% of a chlorinated hydrocarbon liquid solvent, about 0.25 to about 15% by weight of hypophosphorous acid, about 0.25 to about 15% of water by weight of the composition, and about 0.1 to about 2% by weight of an organic corrosion inhibitor.

6. A coating remover composition particularly adapted for removal of coatings based on epoxy resins, consisting essentially of about 40 to about 80% of a chlorinated hydrocarbon liquid solvent, about 0.25 to about 15% by weight of hypophosphorous acid, about 0.25 to about 15% by weight of water, about 3 to about 20% by weight of a coupling agent selected from the group consisting of the lower aliphatic alcohols and their glycol ethers, and about 0.1 to about 2% by weight of an organic corrosion inhibitor.

7. A coating remover composition particularly adapted for removal of coatings based on epoxy resins, consisting essentially of about 40 to about 80% of a chlorinated hydrocarbon, liquid solvent, about 0.25 to about 15% by weight of hypophosphorous acid, about 2 to about 10% by weight of a surface active agent of the group consisting of petroleum sulfonates and alkyl aryl sulfonates, about 0.25 to about 15% by weight of water, about 3 to about 20% by weight of a coupling agent selected from the group consisting of the lower aliphatic alcohols and their glycol ethers, and about 0.1 to about 2% by weight of an organic corrosion inhibitor.

8. A coating remover composition particularly adapted for removal of coatings based on epoxy resins, consisting essentially of about 40 to about 80% of methylene chloride, about 0.25 to about 15% by weight of hypophosphorous acid, about 0.25 to about 15% by weight of water, about 3 to about 20% by weight of a coupling agent of the group consisting of the lower aliphatic alcohols and their glycol ethers, about 0.1 to about 2% by weight of an organic corrosion inhibitor, and about 2 to about 10% by weight of a surface active agent of the group consisting of petroleum sulfonates and alkyl aryl sulfonates.

9. A coating remover composition particularly adapted for removal of coatings based on epoxy resins, consisting essentially of about 40 to about 80% of chlorinated hydrocarbon liquid solvent, about 0.25 to about 15% by weight of hypophosphorous acid, about 0.25 to about 15% by weight of water, about 3 to about 20% by weight of a coupling agent of the group consisting of the lower aliphatic alcohols and their glycol ethers, about 0.1 to about 2% by weight of an organic corrosion inhibitor, about 2 to about 10% by weight of a surface active agent of the group consisting of petroleum sulfonates and alkyl aryl sulfonates, and about 0.1 to about 3% by weight of a wax as an evaporation retardant.

10. A coating remover composition particularly adapted for removal of coatings based on epoxy resins, consisting essentially of about 50 to about 70% by weight of methylene chloride, about 1 to about 10% by weight of hypophosphorous acid, about 0.25 to about 5% by weight of water, about 5 to about 15% by weight of methanol, about 0.3 to about 1.5% of an organic corrosion inhibitor, about 2 to about 10% by weight of a surface active agent of the group consisting of petroleum sulfonates and alkyl aryl sulfonates, and about 0.1 to about 3% by weight of paraffin wax as evaporation retardant.

11. A method for removing chemically resistant organic coatings, comprising contacting said coatings with a composition as defined in claim 1.

12. A method for removing coatings based on an epoxy resin, comprising contacting said coatings with a composition as defined in claim 4.

13. A coating remover composition effective for removal of coatings based on epoxy resins, consisting essentially of about 40 to about 80% by weight of a chlorinated hydrocarbon liquid solvent and about 0.25 to about 15% by weight of hypophosphorous acid.

14. A coating remover composition effective for removal of coatings based on epoxy resins, consisting essentially of about 40 to about 80% by weight of a chlorinated hydrocarbon liquid solvent and about 1% to about 10% by weight of hypophosphorous acid.

15. A coating remover composition effective for removal of coatings based on epoxy resins, consisting essentially of about 40 to about 80% by weight of methylene chloride and about 0.25 to about 15% by weight of hypophosphorus acid.

References Cited in the file of this patent

UNITED STATES PATENTS

| | | |
|---|---|---|
| 2,507,985 | Kuentzel | May 16, 1950 |
| 2,528,378 | Mannheimer | Oct. 31, 1950 |
| 2,852,471 | Atkins, et al. | Sept. 16, 1958 |

OTHER REFERENCES

Lesser, "Paint Remover," Sanitary Chemicals, pages 133–36 and 161 (February 1953).

McCutcheon, "Surfactants Listed," Soap and Chemical Specialties, 4th revision, page 50 (Jan. 1958), and page 65 (March 1958).

"The Condensed Chemical Dictionary," 5th ed. (1956), pages 574, 581, 942, 958.

"The Merck Index," 6th edition (1952), page 441.